March 19, 1968  F. P. BENNETT  3,373,518
SLIDE CHANGING DEVICE

Filed Sept. 29, 1966  2 Sheets-Sheet 1

INVENTOR
FRANK P. BENNETT
BY
ATT'YS.

March 19, 1968     F. P. BENNETT     3,373,518
SLIDE CHANGING DEVICE
Filed Sept. 29, 1966     2 Sheets-Sheet 2
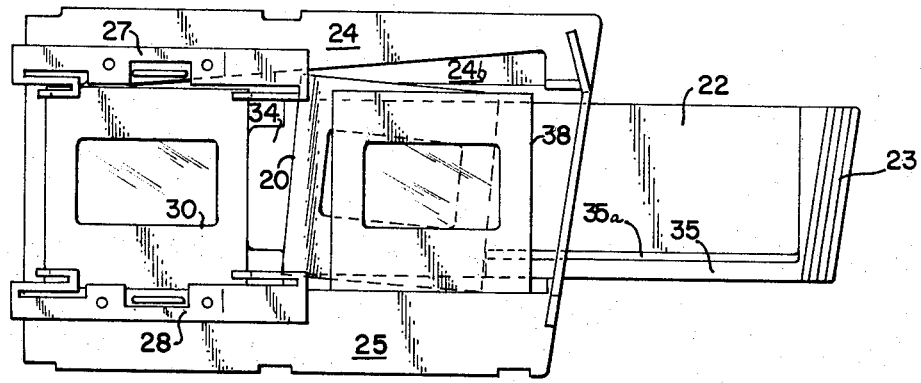
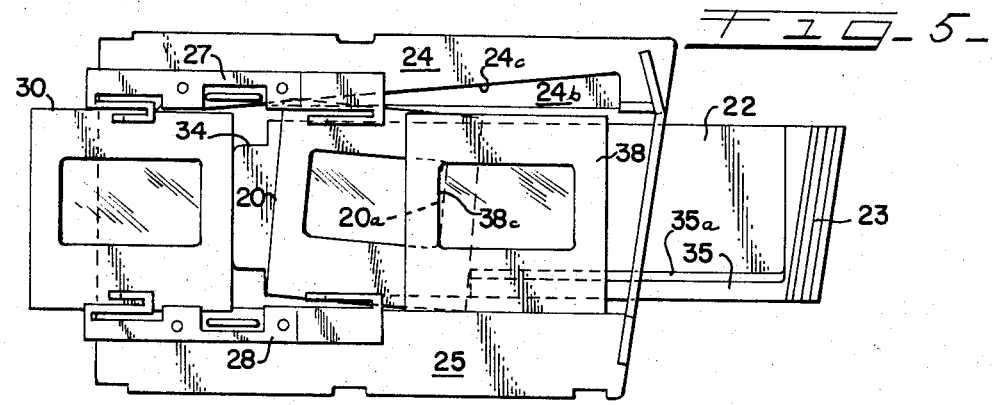
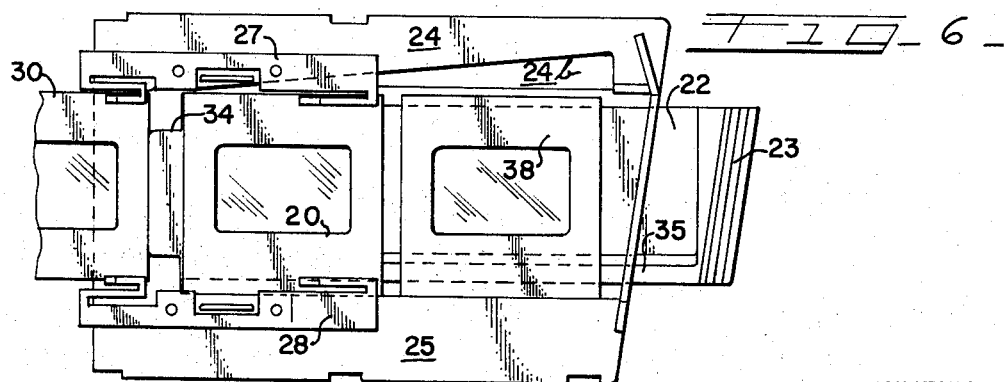
INVENTOR
FRANK P. BENNETT
ATT'YS.

United States Patent Office 3,373,518
Patented Mar. 19, 1968

3,373,518
SLIDE CHANGING DEVICE
Frank P. Bennett, Northbrook, Ill., assignor, by mesne assignments, to General Aniline & Film Corporation, New York, N.Y., a corporation of Delaware
Filed Sept. 29, 1966, Ser. No. 582,995
7 Claims. (Cl. 40—79)

ABSTRACT OF THE DISCLOSURE

A stack of slides is supported with the respective edges thereof in parallel relation with the orientation of the same edges of a slide in the display position. The foremost slide in the stack is frictionally held at the entrance to a guideway for transfer to the slide display position by being engaged on one side thereof by the adjacent slide in the stack and by being engaged on the other side thereof by a guideway surface, such surface engaging the slide at a margin thereof which parallels the direction of slide changer movement. The slide changer includes a formation arranged to engage the trailing edge of the slide adjacent a corner of the slide which adjoins an opposite marginal portion thereby to rock the slide in its own plane to minimize edgewise interference between such foremost slide and the adjacent slide in the stack.

---

The present invention relates in a general way to slide changing devices for photographic slides, and more particularly the present invention relates to a slide changer having new and improved means for rocking a slide in its own plane thereby to facilitate edgewise movement between the latter and an adjacent slide in a stack of such slides.

Stack-type slide magazines are well known in the art for use with both slide projectors and slide viewers. In such magazines, the slides are supported in a supply position in face-to-face relation and moved edgewise one at a time to a display position. These magazines also include a pick-up portion or area wherein the slides are collected, again, usually in face-to-face relation or stack form.

Edgewise sliding movement of the foremost slide in the supply magazine is often impeded or prevented by interference between the edges of the slides defining the respective apertures therein. In United States Horton Patent No. 2,864,190, this edgewise interference is minimized by tilting the supply magazine about an axis normal to the plane of movement of the reciprocating slide carrier thereby to cause rocking of a slide in its own plane as it is moved from the supply position to the display position. This rocking of the slide being advanced, that is, the foremost slide in the supply magazine, causes the aperture edges thereof and the aperture edges of the adjacent slide in the stack to pass obliquely rather than in parallel relation thereby reducing the tendency of such edges to catch on each other. The Horton slide changer has the disadvantage of requiring the associated supply magazine to be tilted. A tilted magazine somewhat complicates construction of the associated changer, viewer or projector, as the case may be, and a tilted magazine is often objectionable because of aesthetic considerations involved in the design of a viewer or projector. The present invention has to do with a new and improved slide changer which rocks a slide in its own plane thereby to facilitate edgewise movement of the same and the adjacent slide in a stack, but which changer does not require the supply magazine to be tilted.

A primary object of the present invention is the provision of a slide changing device including a slide changer for moving slides edgewise one at a time from a stack of such slides, such slide changer having a formation thereon uniquely arranged and adapted to engage the trailing edge of the foremost slide in the stack only adjacent one corner thereof during movement of the slide changer from the supply position to the display position thereby to rock said foremost slide in its own plane to facilitate edgewise sliding movement between the latter and the adjacent slide in a stack.

Another object of the present invention is the provision of a slide changing device including a slide changer reciprocally mounted for moving slides edgewise one at a time from a stack of such slides, a slide holder arranged to hold a stack of slides with the upper and lower edges thereof in parallel relation with the path of movement of the slide changer, wherein the slide changer includes means arranged and adapted to engage the trailing edge of the foremost slide in the stack adjacent only one corner thereof during movement of the slide changer from the supply position to the display position thereby to rock said foremost slide in its own plane for facilitating edgewise sliding movement between the latter and the adjacent slide in the stack.

These and other objects and advantages of the invention will become apparent from the following specification disclosing a preferred embodiment of the invention illustrated in the accompanying drawings wherein:

FIGS. 4, 5 and 6 are views similar to FIG. 2 showing the sequence of operation in advancing a slide in the supply position to the display position.

The slide viewer includes a top housing portion 10 and a bottom housing portion 11. The viewer may be of the type shown in Lanigan Design Patent No. 199,598, assigned to the assignee of the present application. Top housing portion 10 includes an upstanding, generally rectangular in cross-section portion mounting a lens 12 through which a slide may be viewed in the display position. The top housing portion also includes a through opening 14 defined by generally planar side walls 15–18. These walls define a supply magazine for holding a plurality of slides in face-to-face relation for one-at-a-time transfer to the display position behind the lens 12.

Figure 1:
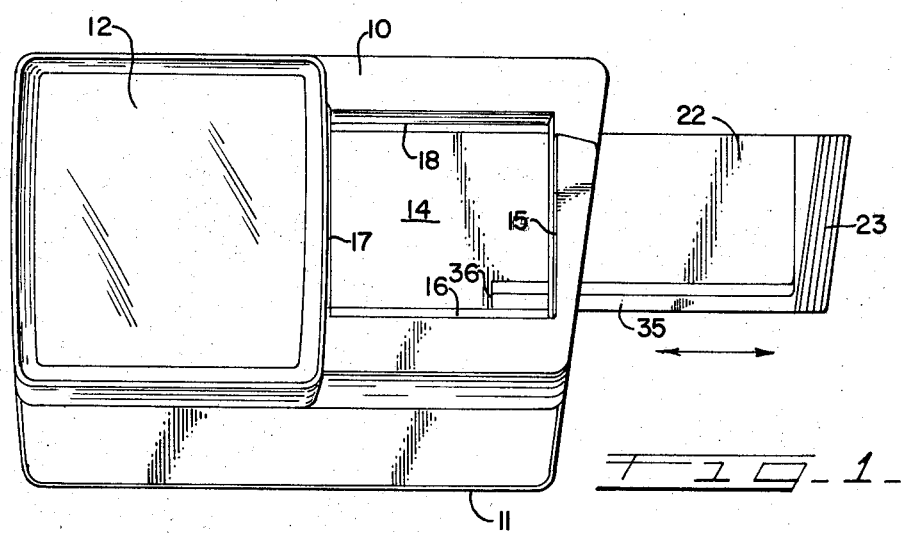
FIG. 1 is a view of a slide viewer embodying the present invention as seen looking along the optical axis of the slide viewer.
Figure 2:
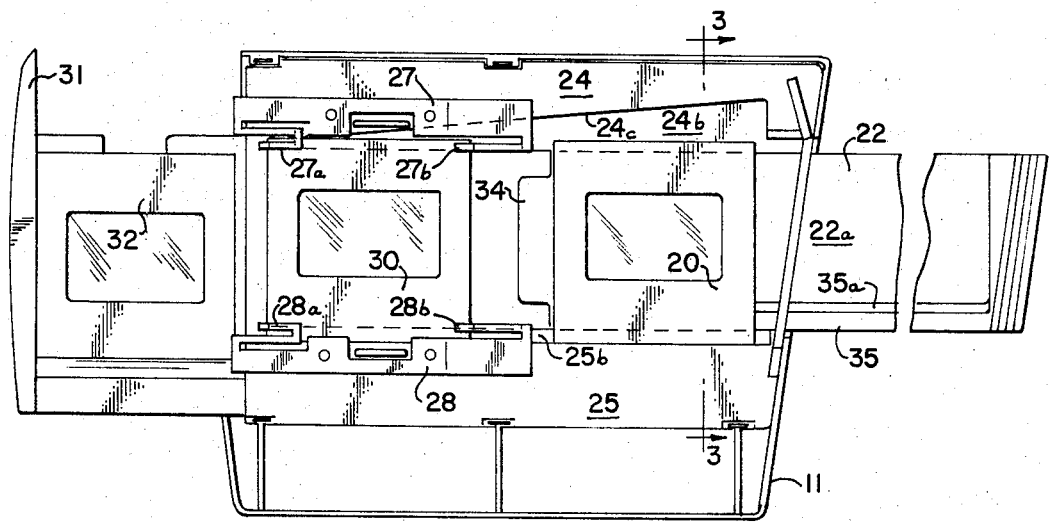
FIG. 2 is a similar view of the slide viewer with the latter having the top housing plate removed and the slide receiving drawer extended.

A slide 20 at the base of such a stack of slides, that is, the foremost slide in the stack, is shown in FIG. 2. It will be understood that the slides are held in the supply magazine in stack form by the force of gravity (as is the case with the viewer shown herein for purposes of illustration), or by some other suitable means, such as a spring. The viewer also includes a slide changing lever 22 preferably mounted for reciprocal movement in the direction of the arrow shown in FIG. 1. The supply magazine defined by the opening 14 supports slides with their upper and lower edges in parallel relation with the direction of movement of the slide changer; although this is not essential it is highly desirable because of constructional and aesthetic considerations. Slide changer 22 includes a ribbed portion 23 to facilitate gripping of the slide changer by a person's finger for manual reciprocation in the directions indicated.

Figure 3:
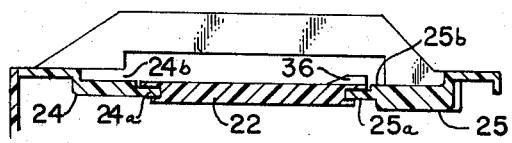
FIG. 3 is a section taken along the line 3—3 of FIG. 2 (except the slide has not been shown)

Referring now to FIG. 2, wherein the viewer is shown with the top housing portion 10 removed, the lower housing portion 11 will be seen to include generally planar, opposed plates 24 and 25. These plates have respective rib portions 24a and 25a (FIG. 3) extending in parallel spaced relation and received in opposed grooves formed in the slide changer 22 thereby slidably supporting the latter for reciprocal movement. Plate 24 has a relieved portion 24b defining a guideway for the upper edge portion of a slide. It will be noted that the relieved area 24b is defined in part by an inclined edge 24c, the purpose of which edge will be explained hereinbelow. Plate 25 includes a relieved area 25b defining a guideway for the lower edge or marginal portion of a slide.

Plates 24 and 25 mount respective spring members 27 and 28. Spring member 27 includes a pair of integral spring fingers 27a and 27b. Similarly, the spring member 28 includes a pair of integral spring fingers 28a and 28b.

A slide 30 is shown in the display position in FIG. 2. This slide is held in such position by being yieldably engaged on the near side thereof by the various spring fingers 27a, 27b, 28a, 28b, and by being engaged on the opposite side thereof by the guideways 24b and 25b. It will be understood that the slide viewer includes suitable illumination means (not shown) arranged on the far side of the slide 30 for illuminating the same to be viewed through the lens 12. Such illumination means may be controlled by a switch (not shown) operated by movement of the slide changer 22.

It will be observed that the viewer includes a drawer 31 (which of itself forms no part of the present invention) adapted in the open position thereof to collect slides after the same have been viewed. In FIG. 2, the drawer 31 will be seen to contain a slide 32; it will be understood that the slide 32 occupied the display position prior to such position being occupied by the slide 30. The drawer 31 is automatically opened or extended by the action of the slide changing lever 22 as will be seen hereinbelow. The slides in the drawer 31 are manually removed after a slide changing operation. The drawer 31 may be pushed into the closed position (FIG. 1) when the viewer is not in use.

The slide changer 22 includes an integral slide pushing tongue 34 which will be referred to hereinbelow in connection with the operation of the slide changer. The slide changer also includes an integral ledge 35 on the near side thereof, which ledge extends along the bottom edge of the slide changer in parallel relation with the direction of movement thereof. The ledge 35 terminates intermediate the ends of the slide changer at a slide pushing surface 36. The ledge 35, the cross section of which defines the shape of the surface 36, has a thickness not greater than the thickness of a slide and a width substantially less than one-half the height of a slide. The ledge is beveled, as at 35a, for joining the near side of the slide changer gradually thereby to provide the near side of the slide changer with smooth surfaces which will not interfere with loading slides in the supply magazine 14 as will be explained below.

The operation of the slide changer is as follows:

Assume the slide changer is withdrawn to the fully extended position (FIG. 2) and assume further that a stack of slides is provided in the supply magazine defined by the opening 14 and the side walls thereof. The foremost slide 20 in the stack is supported in place by being engaged on one side thereof and at the upper and lower marginal portions of such side by the relieved areas 24b and 25b. The slide 20 is in substantial coextensive contact on the other side thereof with the adjacent slide 38 (FIGS. 4, 5 and 6) in the stack. In other words, the slide 20 is frictionally held in position to be advanced to the display position by such engagement on its opposite side portions. Preferably, the near side or face 22a of the slide changer does not engage the adjacent face or side of the foremost slide in the stack, viz., the slide 20.

As the slide changer 22 is pushed from right to left, the slide pushing surface 36 comes into engagement with the trailing edge of the slide 20 adjacent only the lower right-hand corner thereof. Since the slide 20 is engaged at its trailing edge adjacent only one corner thereof, or in other words, since a pushing force is being applied to the slide in an eccentric or unbalanced manner, and since the slide is frictionally supported on opposite sides thereof as just explained, continued movement of the slide changer 22 from right to left causes the slide 20 to be rocked in its own plane as shown in FIG. 4. During continued movement of the slide changer 22 to the left, the slide 20 is maintained in this tilted or non-parallel relation with the adjacent slide 38 as the former passes the latter. As noted in FIG. 5, slide aperture edges 20a and 38a pass obliquely rather than in parallel relation thereby minimizing the possibility of edgewise interference.

As the slide 20 is continued to be advanced from the supply position to the display position by the slide pushing surface 36, the upper left-hand corner of the slide 20 comes into sliding engagement with the wall 24c of the upper guideway 24b (FIG. 5). Such wall cooperates with the slide pushing surface 36 to erect or right the slide 20 and return the upper and lower edges thereof into parallel relation with the direction of movement of the slide changer 22 (FIG. 6). In other words, the edge 24c and the slide pushing surface 36 cooperate to re-orient the slide 20 for being properly held in the display position under the various spring fingers 27a, 27b, 28a and 28b.

As noted in FIGS. 4, 5 and 6, the slide pushing tongue 34 of the slide changer engages the trailing edge of the slide 30 in the display position and pushes the same to the left for dropping into the drawer 31. As mentioned above, the ledge 35 includes the beveled portion 35a. Such a beveled portion prevents interference of the ledge with loading of slides in the supply magazine 14. For example, should the slide changer be pushed to the left in the position shown in either FIGS. 5 or 6 prior to loading of slides in the supply magazine, the ledge 35 will be disposed within the supply magazine 14. Slides are normally loaded in the magazine 14 by inserting the slides bottom edge first. Should the bottom edge of a slide during loading engage the ledge 35 the former will readily slide downwardly until the bottom edge of the slide is received within the lower guideway 25b.

It will be seen that the present invention provides a new and improved slide changer for accomplishing rocking of a slide in its own plane thereby to prevent or at least substantially minimize edgewise interference between the latter and an adjacent slide. The present invention is simple in construction and operation and does not require the supply magazine to be tilted about an axis normal to the plane of movement of the slide changer.

While the invention has been shown in but one form, it will be obvious to those skilled in the art that it is not to be so limited. On the contrary, the invention is susceptible of various forms and modifications without departing from the spirit and scope of the appended claims.

I claim:

1. In a slide changing device of the type in which slides in stack form are moved edgewise one at a time along a guideway from a supply position to a display position, a holder for supporting a stack of slides in said supply position, which holder supports the slides with respective edges thereof in parallel relation with the orientation of the same edges in the display position, the foremost slide in the stack being frictionally held in a position to be advanced to the display position by being engaged on one side thereof by the adjacent slide in the stack and on the other side thereof by a surface on the guideway, a slide changer movable back and forth between the supply position and the display position, such movement of the slide changer being along a path parallel with the upper and lower edges of slides in the supply position, said surface engaging the foremost slide adjacent at least one of the marginal portions thereof which is parallel with the direction of slide changer movement, said slide changer including a formation arranged to engage the trailing edge of the foremost slide during movement of the slide changer toward the display position, said formation engaging said trailing edge only adjacent the slide corner which adjoins the marginal portion opposite said one marginal portion, thereby to rock the foremost slide in its own plane for minimizing edge interference between the latter and said adjacent slide, and means in the guideway co-operating with said formation for advancing the foremost slide toward the display position.

2. In a slide changing device of the type in which slides in stack form are moved edgewise one at a time along a guideway from a supply position to a display position, a holder adjacent one end of the guideway for supporting a stack of slides in said slide position, said guideway being defined in part by a pair of planar surfaces at least one of which is arranged for substantial co-extensive contact with a marginal surface of the foremost slide in the stack thereby to co-operate with the slide adjacent such foremost slide for frictionally holding the latter in position to be advanced from the supply position to the display position, said planar surfaces defining therebetween a rectilinear slideway extending in parallel relation with upper and lower edges of slides in the supply position, an elongated slide changer mounted in said slideway for reciprocal movement therealong between the supply and display positions, said slide changer including a formation arranged, upon movement of the changer from the supply position to the display position, to engage the trailing edge of said foremost slide, said formation engaging said trailing edge only adjacent the slide corner which adjoins the slide marginal surface opposite said first mentioned marginal surface, for rocking said slide in its own plane thereby to facilitate sliding movement between the same and said adjacent slide, and another surface in the guideway co-operating with said formation to advance the foremost slide to the display position.

3. The construction according to claim 2 wherein said formation is defined by one end of a ledge extending along the slide changer in parallel relation with the direction of movement of the latter, said one end being disposed intermediate the ends of said changer.

4. The construction according to claim 2 wherein said holder supports slides with respective edges thereof in parallel relation with the orientation of the same edges in the display position, and wherein said another surface is arranged to be engaged by the slide approaching the display position thereby again to rock such slide for orientating the same in the display position.

5. In a slide changing device of the type in which slides in stack form are moved edgewise one at a time along a guideway from a supply position to a display position, a holder adjacent one end of the guideway for supporting a stack of slides in said supply position, said guideway including one or more surfaces co-operating with the slide in the stack adjacent the foremost slide in engaging opposite marginal portions of the latter thereby frictionally to hold the same in position to be advanced from the supply position to the display position, an elongated, generally planar slide changer slidable in said guideway in a plane parallel with slides in the stack for movement between the display and supply positions, said slide changer having an inner end and an outer end, said slide changer having formed thereon a ledge extending in parallel relation with the direction of movement of the slide changer, which ledge has one end thereof intermediate the ends of the changer and the other end thereof adjacent the outer end of the changer, said one end of the ledge having a thickness not greater than the thickness of a slide and a width substantially less than one-half the height of a slide, said one end of the ledge being arranged, during movement of the slide changer from the supply position toward the display position, to engage the trailing edge of the foremost slide in the stack adjacent only one corner thereof for rocking said foremost slide in its own plane thereby to facilitate sliding movement between the latter and said adjacent slide, said guideway including another surface co-operating with said one end of the ledge to advance the foremost slide to the display position.

6. The construction according to claim 5 wherein said ledge is formed integrally with the slide changer and wherein the ledge is beveled along its length.

7. In a slide changing device of the type in which slides in stack form are moved edgewise one at a time along a guideway from a supply position to a display position by an oscillating slide changer, each slide being characterized as having opposite leading and trailing edges and opposite first and second edges, the improvement comprising, a holder adjacent one end of the guideway for supporting a stack of slides in said supply position, means in the guideway co-operating with the slide in the stack adjacent the foremost slide therein for frictionally holding such foremost slide in position to be advanced from the supply position to the display position, said means including a surface engaging the adjoining side of said foremost slide adjacent said one edge thereof, a formation on said slide changer, said formation having a slide pushing surface with a thickness not greater than the thickness of a slide and a width substantially less than one-half the height of a slide, pushing surface being arranged to engage the trailing edge of said foremost slide during movement of the slide changer from the supply position to the display position, said pusihng surface engaging said trailing edge adjacent only the slide corner which adjoins said second edge, thereby to rock the foremost slide in its own plane for facilitating movement between the latter and said adjacent slide, and other means in the guideway co-operating with said slide pushing surface for advancing the foremost slide to the display position.

References Cited

UNITED STATES PATENTS

| 2,864,190 | 12/1958 | Horton | 40—79 |
| 3,014,296 | 12/1961 | Walter | 40—79 |
| 3,238,653 | 3/1966 | Wiklund | 40—79 |

EUGENE R. CAPOZIO, *Primary Examiner.*

R. CARTER, *Assistant Examiner.*